(12) United States Patent
Kobayashi

(10) Patent No.: US 7,770,211 B2
(45) Date of Patent: Aug. 3, 2010

(54) UNAUTHORIZED ACCESS PREVENTION METHOD, UNAUTHORIZED ACCESS PREVENTION APPARATUS AND UNAUTHORIZED ACCESS PREVENTION PROGRAM

(75) Inventor: Yoshikazu Kobayashi, Kanagawa (JP)

(73) Assignee: NEC Infrontia Corporation, Kanagawa (JP)

(*) Notice: Subject to any disclaimer, the term of this patent is extended or adjusted under 35 U.S.C. 154(b) by 1449 days.

(21) Appl. No.: 11/152,379

(22) Filed: Jun. 15, 2005

(65) Prior Publication Data
US 2005/0283827 A1     Dec. 22, 2005

(30) Foreign Application Priority Data
Jun. 16, 2004   (JP)   ............... 2004-178334

(51) Int. Cl.
G06F 7/04 (2006.01)
G06F 11/00 (2006.01)
G06F 12/14 (2006.01)
H04J 1/14 (2006.01)
H04L 12/66 (2006.01)
H04L 1/18 (2006.01)
H04L 29/06 (2006.01)
G06F 13/00 (2006.01)

(52) U.S. Cl. ............... 726/3; 726/22; 713/188; 370/496

(58) Field of Classification Search ............ 726/3, 726/22; 713/188; 370/496
See application file for complete search history.

(56) References Cited

U.S. PATENT DOCUMENTS 5,835,726 A   11/1998   Shwed et al.
5,878,231 A   3/1999   Baehr et al.
7,467,408 B1*   12/2008   O'Toole, Jr. ............. 726/22

(Continued)

FOREIGN PATENT DOCUMENTS

EP   1855409 A1 *   11/2007

(Continued)

OTHER PUBLICATIONS

Thomas C. Schmidt, Matthias Wählisch, Olaf Christ, "AuthoCast: a protocol for mobile multicast sender authentication", Nov. 2008, MoMM '08: Proceedings of the 6th International Conference on Advances in Mobile Computing and Multimedia Publisher: ACM, pp. 142-149.*

(Continued)

Primary Examiner—Matthew B Smithers
Assistant Examiner—Courtney D Fields
(74) Attorney, Agent, or Firm—Sughrue Mion, PLLC

(57) ABSTRACT

Unauthorized access from a network to a terminal is prevented. If a signaling packet received from an external terminal contains a virus, the signaling packet is discarded. If the signaling packet does not apparently contains a virus, an unnecessary part is deleted and the signaling packet is transferred to an internal terminal in response to a polling signal. A port number described in a response packet received from the internal terminal is translated to a different port number. If a session packet received from the external terminal does not conform to a predetermined protocol, the session packet is discarded. If the session packet received from the external terminal conforms to the predetermined protocol, a port number is subject to reverse translation and a resultant session packet is transferred to the internal terminal.

18 Claims, 9 Drawing Sheets

U.S. PATENT DOCUMENTS

| | | |
|---|---|---|
| 2003/0048793 A1 | 3/2003 | Pochon et al. |
| 2004/0190557 A1* | 9/2004 | Barron .................. 370/496 |
| 2005/0091514 A1* | 4/2005 | Fukumoto et al. ........... 713/188 |

FOREIGN PATENT DOCUMENTS

| | | |
|---|---|---|
| JP | H02-024694 A | 1/1990 |
| JP | 2002-312261 A | 10/2002 |
| JP | 2003-050756 A | 2/2003 |
| JP | 2003-110628 A | 4/2003 |

OTHER PUBLICATIONS

RFC 3261 standards; http://www.ietf.org/rfc/rfc3261.txt.
RFC 2327 standards; http://www.ietf.org/rfc/rfc2327.txt?number=2327.
RFC 3550 standards; http://rfc3550.x42.com/.

* cited by examiner

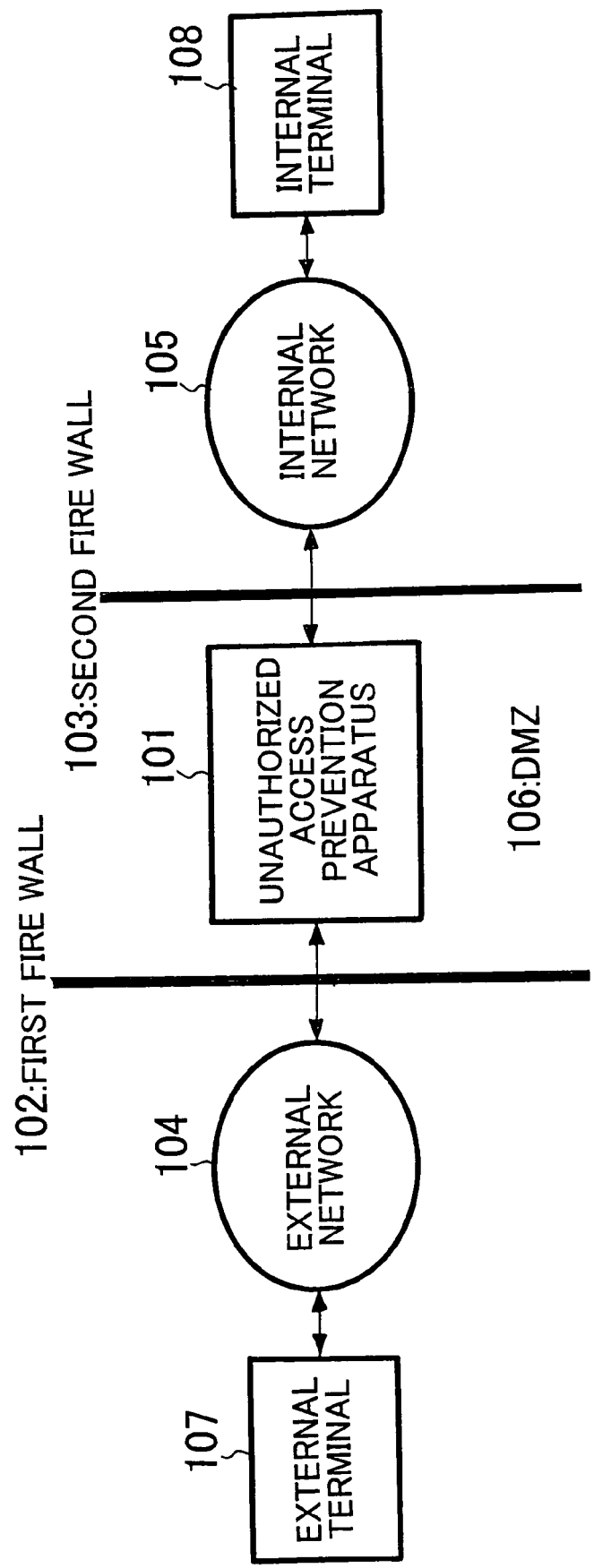

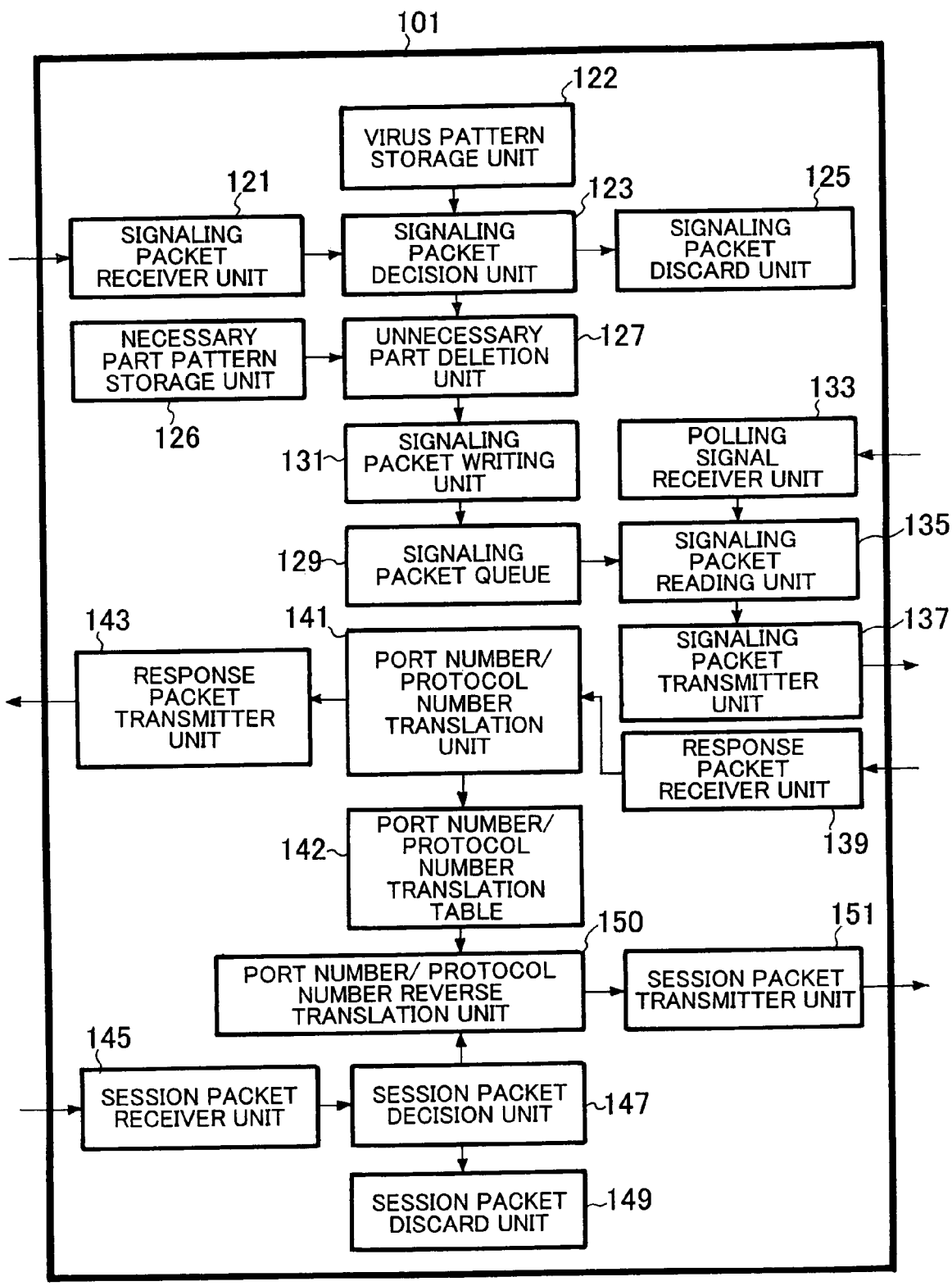

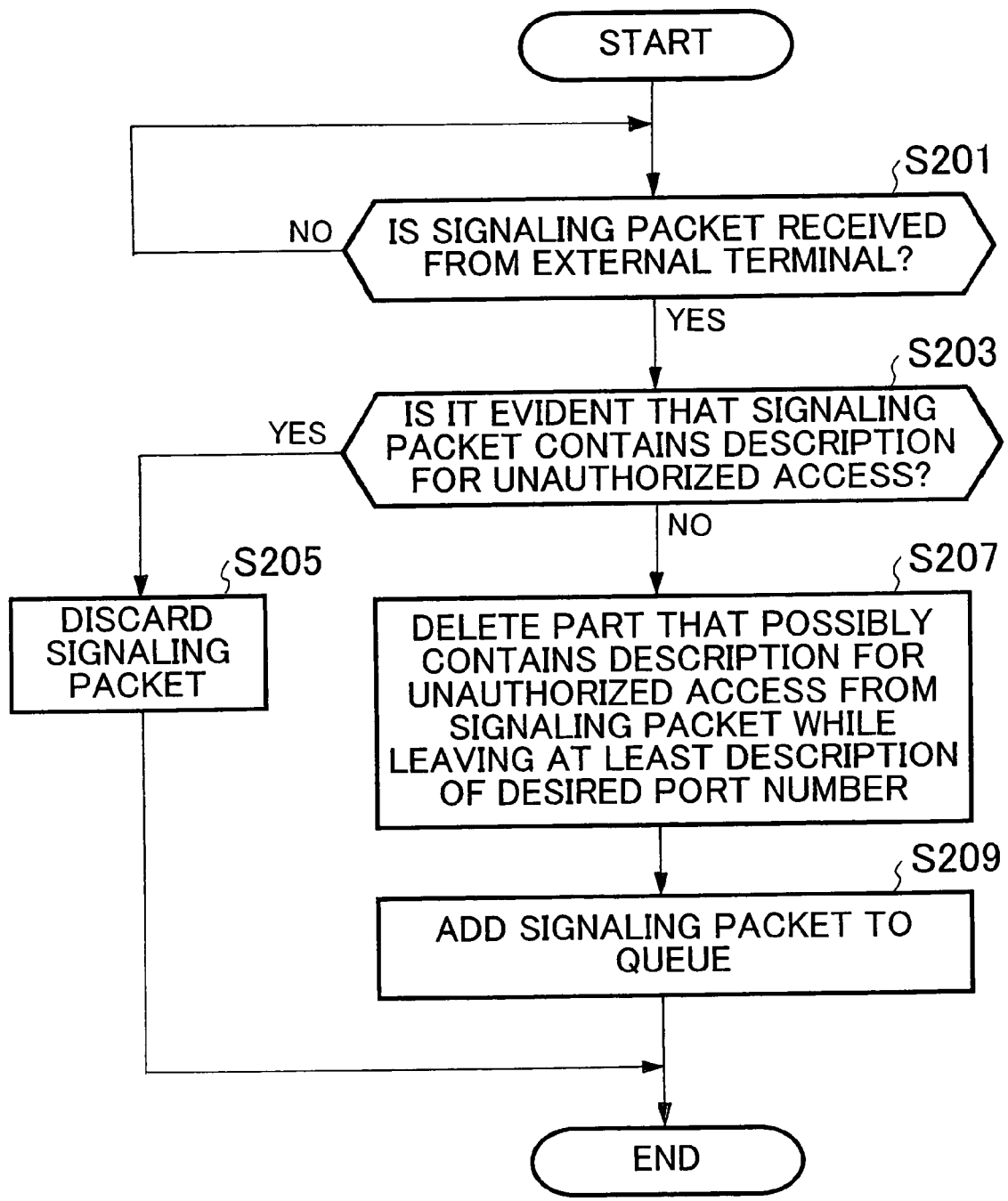

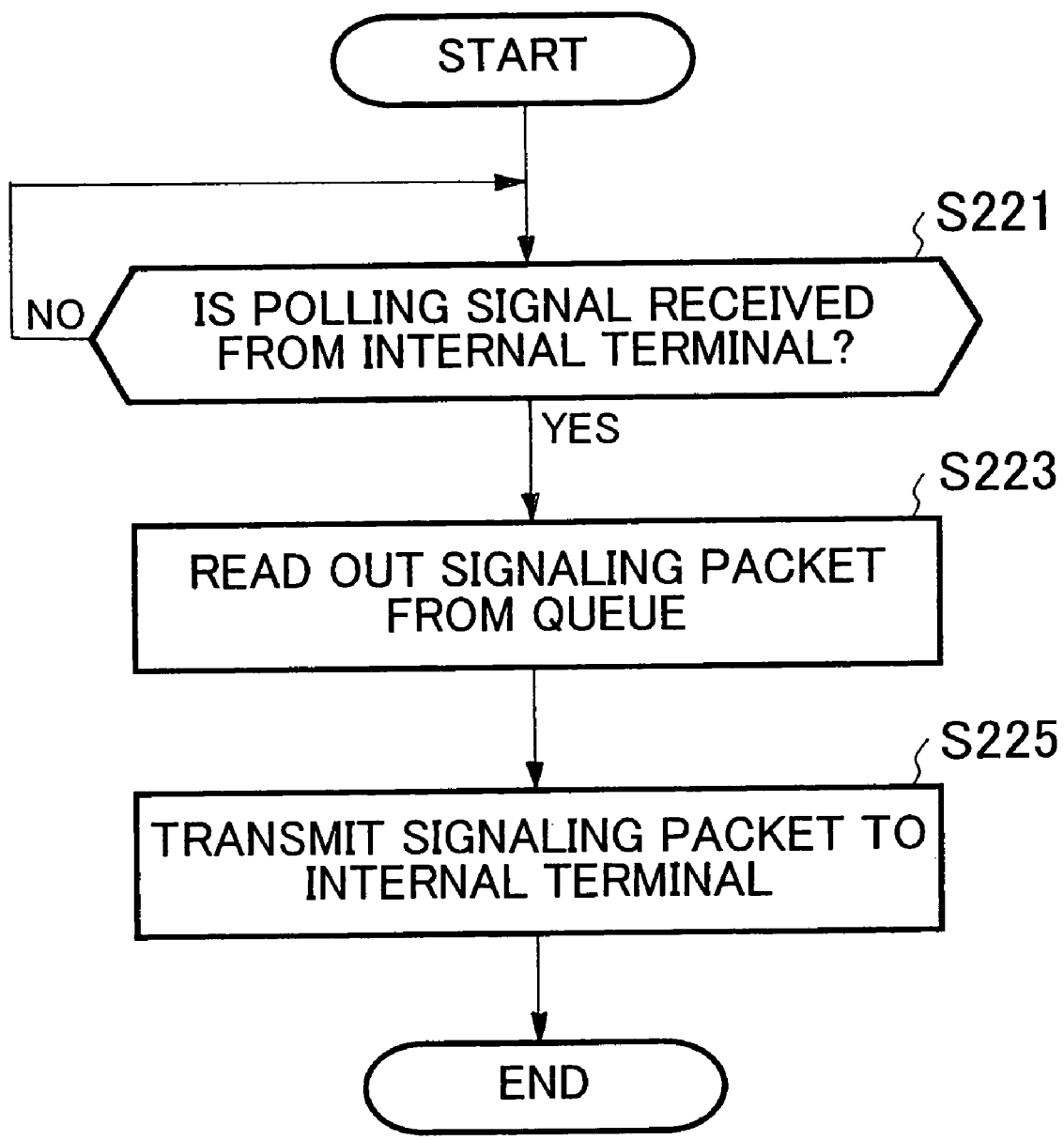

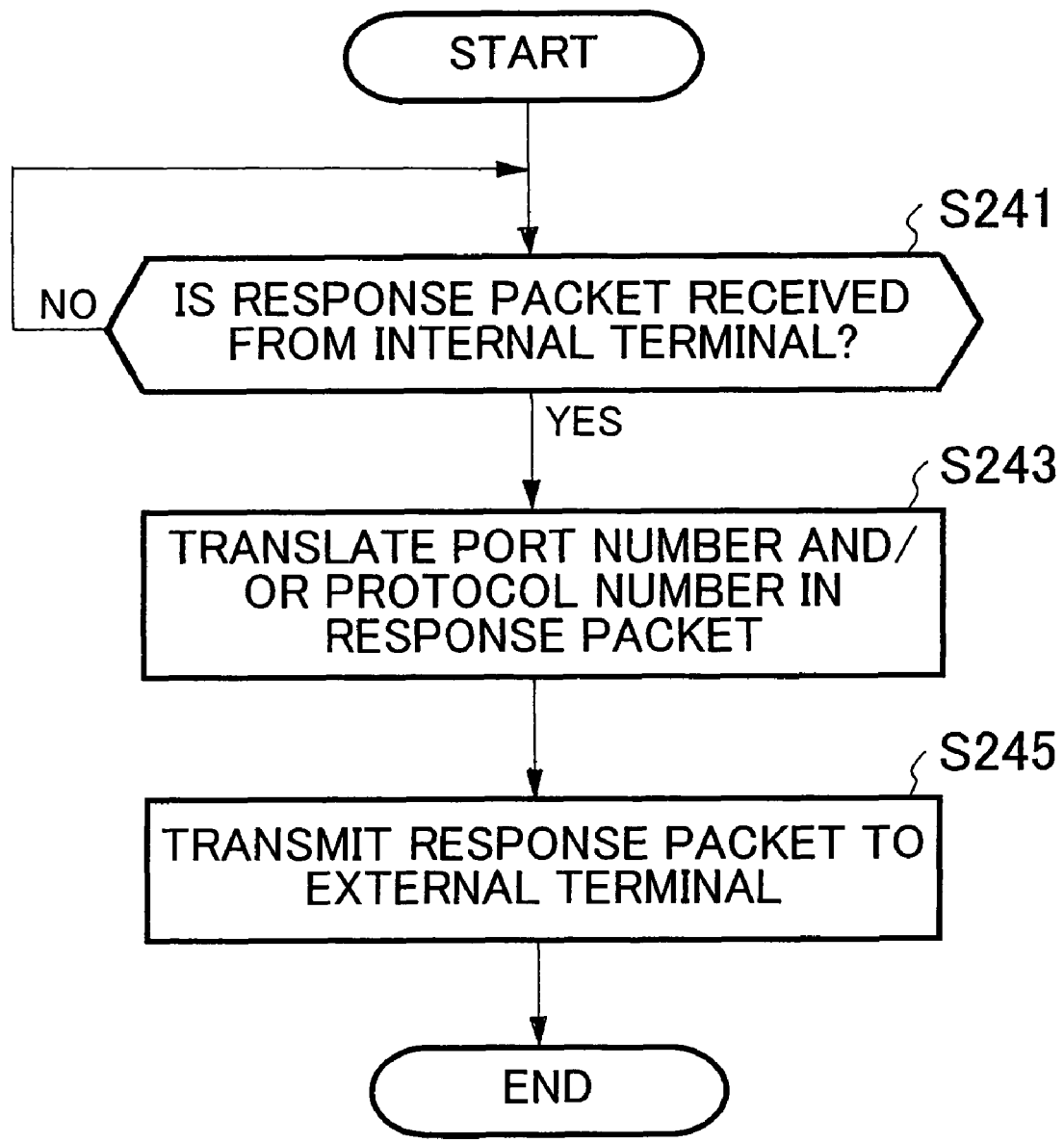

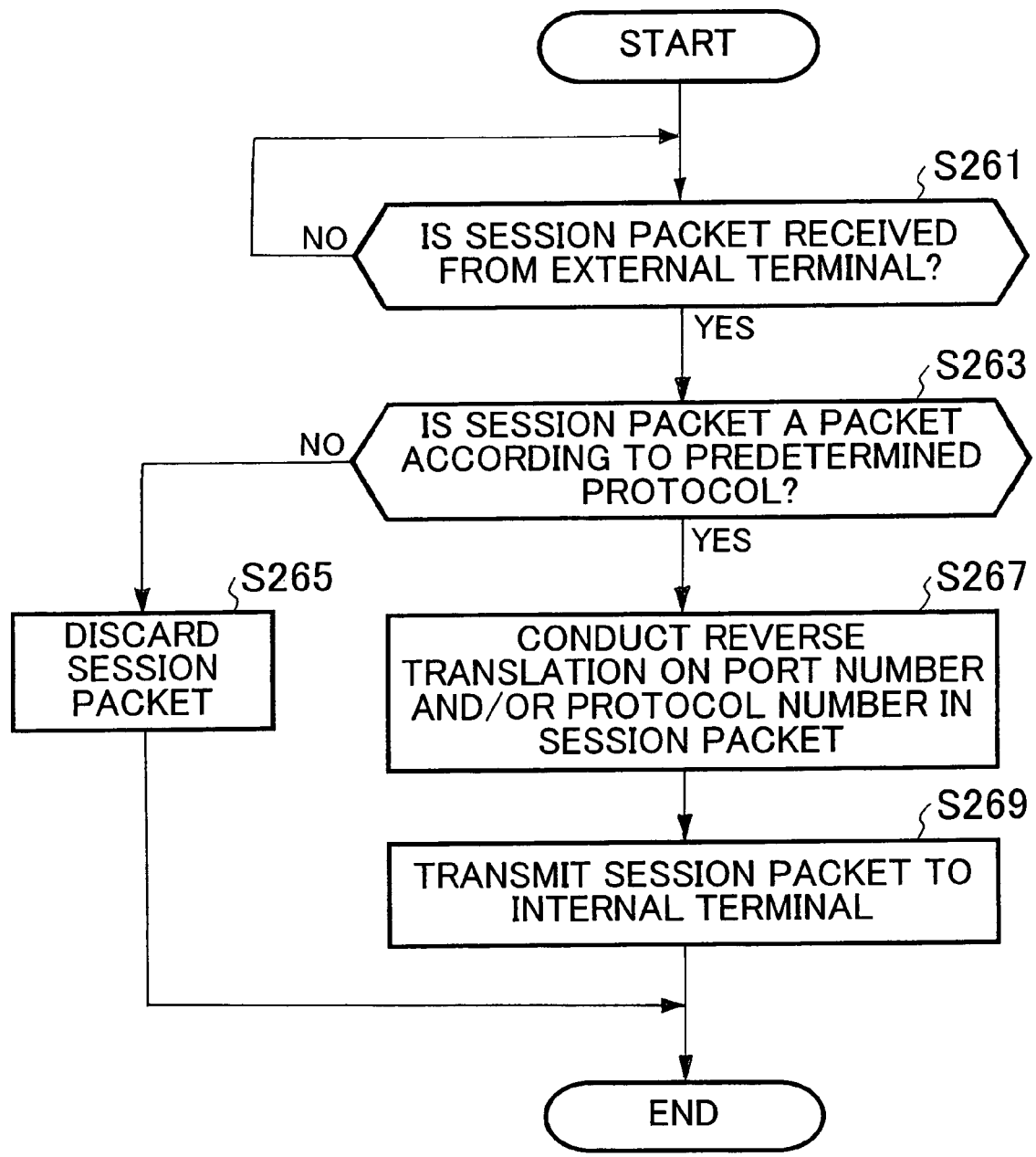

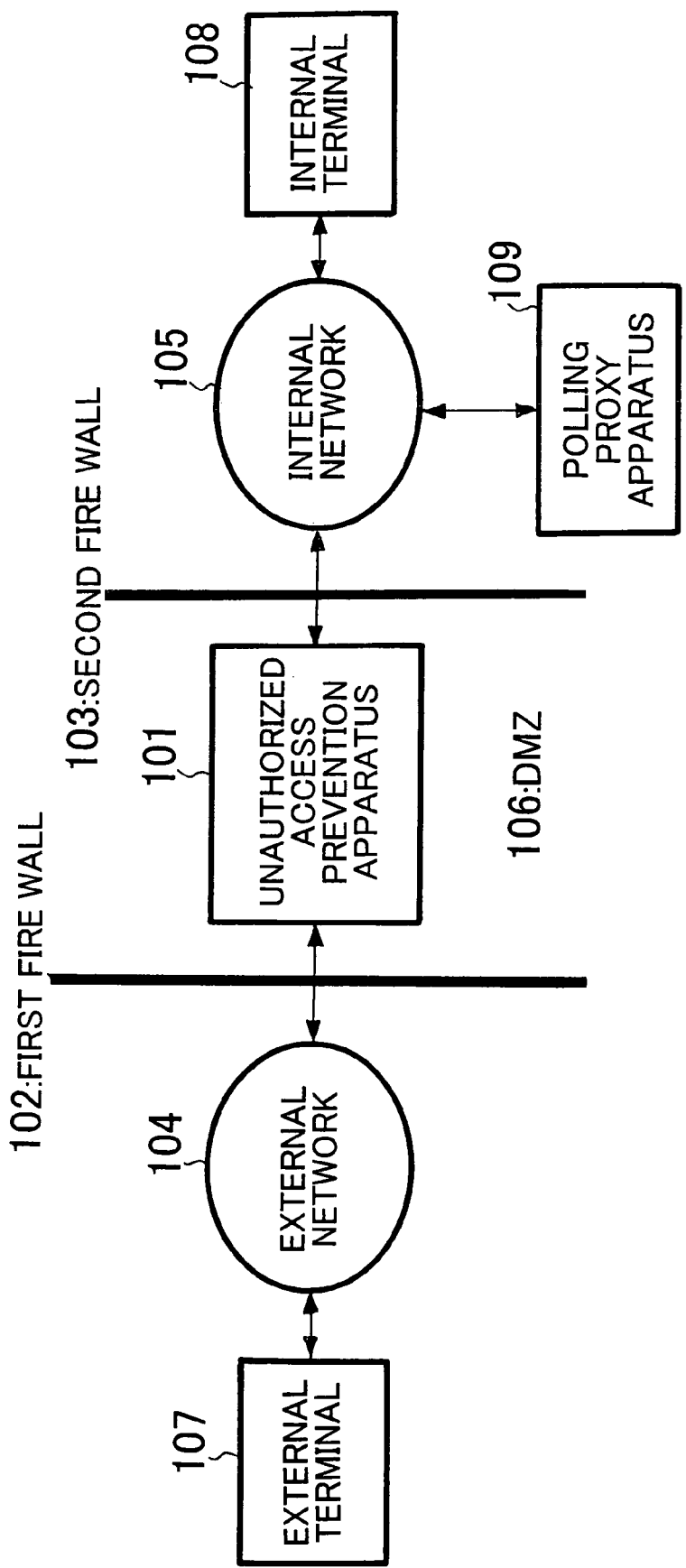

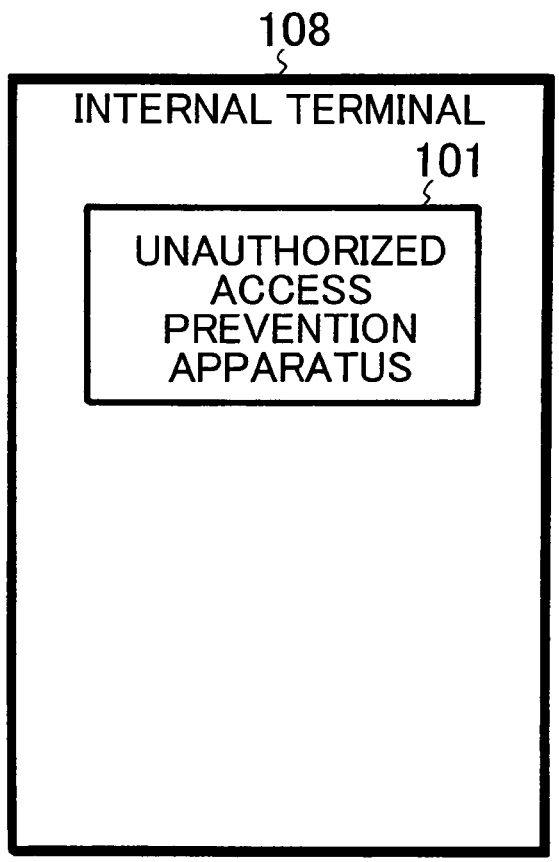
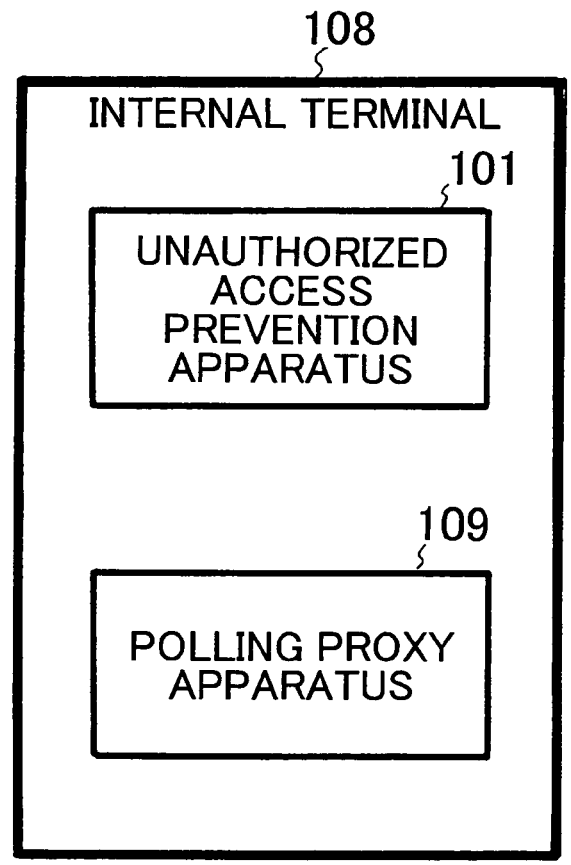

UNAUTHORIZED ACCESS PREVENTION METHOD, UNAUTHORIZED ACCESS PREVENTION APPARATUS AND UNAUTHORIZED ACCESS PREVENTION PROGRAM

BACKGROUND OF THE INVENTION

1. Field of the Invention

The present invention relates to an unauthorized access prevention method, an unauthorized access prevention apparatus and an unauthorized access prevention program for preventing unauthorized access conducted from a network to a terminal.

2. Description of the Related Art

In recent years, IP (Internet Protocol) telephone and video phone have been put into practical use by using RTP (Real-time Transport Protocol) packets having codec signals in their payloads on the Internet.

In order to start a session of RTP packet transmission, signaling is conducted by using, for example, the SIP (Session Initiation Protocol) or H.323. A SIP message contains a SIP header and a SIP body, and the SIP body contains a description according to the SDP (Session Description Protocol).

While the session of RTP packet transmission is being executed, session control is conducted by using the RTCP (RTP Control Protocol).

As preceding technical papers relating to the present invention, the following papers can be mentioned:

RFC 3261 standards
http://www.ietf.org/rfc/rfc3261.txt
RFC 2327 standards
http://www.ietf.org/rfc/rfc2327.txt?number=2327
RFC 3550 standards
http://rfc3550.x42.com/

The first paper relates to the SIP. The second paper relates to the SDP. The third paper relates to the RTCP.

At the time of signaling and session execution, a virus is sent into a terminal sometimes as hereafter described.

A virus is made to conceal itself in a header or a payload of a signaling packet.

A large number of signaling packets are sent to cause overflow of a buffer and thereby prevent a virus check function from being effective.

At the time of signaling before starting the session, not only a port used to transmit video data or music data but also another port is opened to traffic. A virus is also transmitted by using the other port together with the video data or music data for streaming.

SUMMARY OF THE INVENTION

Therefore, an object of the present invention is to provide an unauthorized access prevention method, an unauthorized access prevention apparatus and an unauthorized access prevention program that make it possible to prevent a virus from intruding into a terminal by preventing unauthorized access conducted from a network to the terminal.

The present invention provides an unauthorized access prevention method used to prevent unauthorized access from a network, including the steps of receiving a signaling packet for starting a session from a device connected to the network, detecting whether the signaling packet received from the device connected to the network contains a description for unauthorized access, discarding a signaling packet which apparently contains a description for unauthorized access, deleting descriptions of other items from the signaling packet which does not apparently contain the description for unauthorized access, while leaving descriptions of predetermined items including at least a description of a desired port number indicating a port number desired to be used in the session at the signaling packet which does not apparently contain the description for unauthorized access, and transmitting the signaling packet obtained after the deletion is conducted to a signaling packet processing unit.

In the unauthorized access prevention method, transmission of the signaling packet obtained after the deletion is conducted to the signaling packet processing unit may be conducted in response to polling.

The unauthorized access prevention method may further include the steps of receiving a response packet, responding to the signaling packet, from the signaling packet processing unit, the response packet containing an available port number indicating a port number which can be used by a session unit to conduct the session, translating the available port number to a different port number, and transmitting the response packet with the available port number translated to the different port number to the device connected to the network.

The unauthorized access prevention method may further include the steps of receiving a session packet using a port having the different port number contained in the response packet transmitted to the device connected to the network, from the device connected to the network, detecting whether or not the session packet is a packet according to a predetermined protocol, discarding the session packet if the session packet is not a packet according to a predetermined protocol, and conducting reverse translation on a port number in the session packet judged to be a packet according to a predetermined protocol, thereby obtaining a port number before translation, and transmitting a resultant session packet to the session unit.

In the unauthorized access prevention method, instead of or in addition to translating the available port number to a different port number, an available fourth layer protocol number indicating a fourth layer protocol number which can be used in the session may be translated to a different fourth layer protocol number.

According to the present invention, the following effects are brought about.

Since an illegal signaling packet does not arrive at the signaling packet processing unit, it is possible to prevent a terminal from being infected with a virus.

Since transmission of a signaling packet to the signaling packet processing unit is conducted in response to polling, overflow of a buffer disposed on the signaling packet processing unit side can be prevented. Furthermore, even if a signaling packet queue overflows and the virus checking function does not operate, it is possible to prevent a signaling packet having a virus concealing itself therein from being actively transmitted to the signaling packet processing unit.

Since the available port number is translated to a different port number, it is possible to cause the side that has transmitted a signaling packet to give up the session start. Therefore, it is possible to prevent a session packet having a virus concealing itself therein from being received.

If a received session packet is not a session packet conforming to a predetermined protocol, the session packet is discarded. Since a session packet having a virus concealing itself therein is not a session packet of a predetermined protocol, the session packet having a virus concealing itself therein can be discarded. On the other hand, since an audio packet or an image packet is a session packet conforming to a predetermined protocol, it arrives at the internal terminal without being discarded.

BRIEF DESCRIPTION OF THE DRAWINGS

FIG. 1 is a block diagram showing a configuration of a communication system according to an embodiment of the present invention;

FIG. 2 is a block diagram showing a configuration of an unauthorized access prevention apparatus according to an embodiment of the present invention;

FIG. 3 is a first flow chart showing an unauthorized access prevention method used by an unauthorized access prevention apparatus according to an embodiment of the present invention;

FIG. 4 is a second flow chart showing an unauthorized access prevention method used by an unauthorized access prevention apparatus according to an embodiment of the present invention;

FIG. 5 is a third flow chart showing an unauthorized access prevention method used by an unauthorized access prevention apparatus according to an embodiment of the present invention;

FIG. 6 is a fourth flow chart showing an unauthorized access prevention method used by an unauthorized access prevention apparatus according to an embodiment of the present invention;

FIG. 7 is a block diagram showing a configuration of a communication system according to another embodiment of the present invention; FIGS. 9A and 9B are block diagrams showing configurations of an internal terminal according to still another embodiment of the present invention.

DESCRIPTION OF THE PREFERRED EMBODIMENTS

Figure 8A:
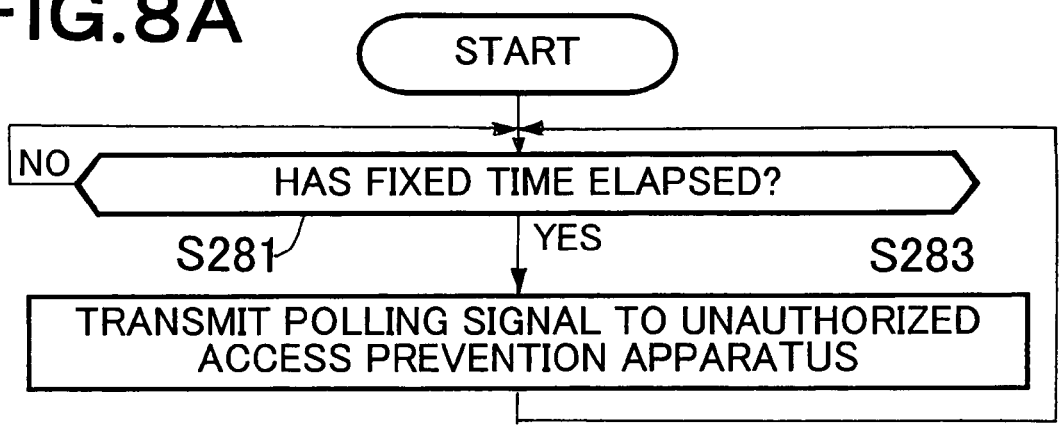
FIGS. 8A, 8B and 8C are flow charts showing operation conducted by a polling proxy apparatus according to an embodiment of the present invention.

Hereafter, embodiments of the present invention will be described with reference to the drawings.

FIG. 1 shows a configuration of a communication system according to an embodiment of the present invention.

With reference to FIG. 1, the communication system according to the embodiment of the present invention includes an unauthorized access prevention apparatus 101, a first fire wall 102, a second fire wall 103, an external network 104, an internal network 105, an external terminal 107, and an internal terminal 108. The external terminal 107 may be replaced by an external server.

The external terminal 107 is connected to the external network 104. The internal terminal 108 is connected to the internal network 105. The unauthorized access prevention apparatus 101 is connected to the external network 104 and the internal network 105. The first fire wall 102 and the second fire wall 103 are present between the external network 104 and the internal network 105. An area between the first fire wall 102 and the second fire wall 103 is a DMZ (DeMilitarized Zone). The unauthorized access prevention apparatus 101 is present in the DMZ.

FIG. 2 is a block diagram showing a configuration of the unauthorized access prevention apparatus 101.

With reference to FIG. 2, the unauthorized access prevention apparatus includes a signaling packet receiver unit 121, a virus pattern storage unit 122, a signaling packet decision unit 123, a signaling packet discard unit 125, a necessary part pattern storage unit 126, an unnecessary part deletion unit 127, a signaling packet queue 129, a signaling packet writing unit 131, a polling signal receiver unit 133, a signaling packet reading unit 135, a signaling packet transmitter unit 137, a response packet receiver unit 139, a port number/protocol number translation unit 141, a port number/protocol number translation table 142, a response packet transmitter unit 143, a session packet receiver unit 145, a session packet decision unit 147, a session packet discard unit 149, a port number/protocol number reverse translation unit 150 and a session packet transmitter unit 151.

The virus pattern storage unit 122, the necessary part pattern storage unit 126, the signaling packet queue 129, and the port number/protocol number translation table 142 are constructed in a recording medium such as a RAM. Other components, i.e., the signaling packet receiver unit 121, the signaling packet decision unit 123, the signaling packet discard unit 125, the unnecessary part deletion unit 127, the signaling packet writing unit 131, the polling signal receiver unit 133, the signaling packet reading unit 135, the signaling packet transmitter unit 137, the response packet receiver unit 139, the port number/protocol number translation unit 141, the response packet transmitter unit 143, the session packet receiver unit 145, the session packet decision unit 147, the session packet discard unit 149, the port number/protocol number reverse translation unit 150 and the session packet transmitter unit 151 may be implemented by using hardware. Alternatively, a computer may read from a computer-readable medium and execute a program which makes the computer function as those components.

The signaling packet receiver unit 121 receives a signaling packet from the external terminal 107 via the external network 104. The signaling packet is, for example, a packet according to the SIP, a packet according to H.323, or a packet according to the RTCP. The virus pattern storage unit 122 stores virus patterns. The signaling packet decision unit 123 is supplied with a signaling packet from the signaling packet receiver unit 121. The signaling packet decision unit 123 makes a decision whether the signaling packet contains a virus pattern stored in the virus pattern storage unit 122. The signaling packet decision unit 123 outputs a signaling packet which apparently contains a virus pattern to the signaling packet discard unit 125, and outputs a signaling packet which does not apparently contain a virus pattern to the unnecessary part deletion unit 127.

The signaling packet discard unit 125 discards a packet decided to contain a virus pattern by the signaling packet decision unit 123.

The necessary part pattern storage unit 126 stores a pattern (necessary part pattern) of a part in a signaling packet that needs to be transferred to the internal terminal 108. The necessary part pattern includes at least a pattern of a part describing a port number desired by the external terminal 107 to be used in the session. The unnecessary part deletion unit 127 compares a signaling packet which does not apparently contain a virus pattern with a necessary part pattern stored in the necessary part pattern storage unit 126, and thereby deletes parts (unnecessary parts) other than the necessary part from the signaling packet which does not apparently to contain a virus pattern.

The signaling packet writing unit 131 writes a signaling packet which does not apparently contain a virus pattern and which does not contain unnecessary parts into the signaling queue 129.

The polling signal receiver unit 133 receives a polling signal from the internal terminal 108 via the internal network 105. Each time the polling signal receiver unit 133 receives a polling signal, the signaling packet reading unit 135 reads out a signaling packet from the signaling queue 129. The signaling packet transmitter unit 137 transmits a signaling packet read out by the signaling packet reading unit 135 to a signaling packet processing unit in the internal terminal 108 via the internal network 105.

The response packet receiver unit 139 receives a response packet from the signaling packet processing unit in the internal terminal 108 via the internal network 105. In the response packet, a port number desired by the signaling packet processing unit to be used in the session is described. The port number desired by the signaling packet processing unit to be used in the session is often the same as the port number described in the signaling packet (the port number desired by the external terminal 107).

The port number/protocol number translation unit 141 translates a port number described in a response packet received by the response packet receiver unit 139 to another port number, and writes the port number before the translation and the port number after the translation into the port number/protocol number translation table 142. In addition to altering a port number or instead of altering a port number, the port number/protocol number translation unit 141 may translate a fourth layer protocol number described in the response packet to another fourth layer protocol number and write the fourth layer protocol number before the translation and the fourth layer protocol number after the translation in the port number/protocol number translation table 142. The response packet transmission unit 143 transmits the packet passed through the port number/protocol number translation unit 141 to the external terminal 107 via the external network 104.

The session packet receiver unit 145 receives a session packet from the external terminal 107 via the external network 104. The session packet is, for example, an RTP packet. If the port number/protocol number translation unit 141 has translated a port number, the session packet contains the port number after the translation.

The session packet decision unit 147 determines whether or not a session packet received by the session packet receiver unit 145 is a session packet according to a predetermined protocol (referred to as predetermined "upper protocol") in the fifth layer or upper of the OSI reference model. For example, the session packet decision unit 147 determines whether a packet inserted in an RTP packet which is a session packet received by the session packet receiver unit 145 is a video packet or an audio packet. If the packet inserted in the RTP packet is not a video packet or an audio packet, there is a possibility that it is a packet containing a virus. If a packet inserted into an RTP packet which is a session packet is a session packet according to a predetermined upper protocol, therefore, the session packet decision unit 147 outputs the session packet to the port number/protocol number reverse translation unit 150. Otherwise, the session packet decision unit 147 outputs the session packet to the session packet discard unit 149.

The session packet discard unit 149 discards a session packet that is not a session packet according to the predetermined upper protocol.

The port number/protocol number reverse translation unit 150 refers to the port number/protocol number translation table 142. If a port number in a session packet according to a predetermined upper protocol is translated, the port number/protocol number reverse translation unit 150 conducts reverse translation on the port number in the session packet to obtain the port number before the translation. The port number/protocol number reverse translation unit 150 refers to the port number/protocol number translation table. If a fourth layer protocol number in a session packet according to a predetermined upper protocol is translated, the port number/protocol number reverse translation unit 150 conducts reverse translation on the fourth layer protocol number in the session packet to obtain the fourth layer protocol number before the translation.

The session packet transmission unit 151 transmits a session packet passed through the port number/protocol number reverse translation unit 150 to a session unit in the internal terminal 108 via the internal network.

An unauthorized access prevention method according to an embodiment of the present invention will now be described with reference to FIGS. 1 to 6.

With reference to FIG. 3, first, the signaling packet receiver unit 121 continues to wait until it receives a signaling packet from the external terminal 107 (step S201). If a signaling packet is received (yes at the step S201), the signaling packet decision unit 123 determines whether the received signaling packet apparently contains a description (such as a virus pattern) for unauthorized access (step S203). If so (yes at the step S203), the signaling packet discard unit 125 discards the signaling packet (step S205).

Otherwise (no at the step S203), the unnecessary part deletion unit 127 leaves a part of the signaling packet having a pattern of a necessary part stored in the necessary part pattern storage unit 126, and deletes other parts (step S207). Subsequently, the signaling packet writing unit 131 adds the signaling packet to the signaling packet queue 129 (step S209).

With reference to FIG. 4, the polling signal receiver unit 133 continues to wait until it receives a polling signal from the internal terminal 108 (step S221). If a polling signal is received (yes at the step S221), the signaling packet reading unit 35 reads out a signaling packet from the signaling packet queue 129 (step S223). Subsequently, the signaling packet transmission unit 137 transmits the signaling packet to the internal terminal 108 (step S225).

With reference to FIG. 5, the response packet receiver unit 139 continues to wait until it receives a response packet, responding to a signaling packet, from the internal terminal 108 (step S241). If a response packet is received (yes at the step S241), the port number/protocol number translation unit 141 translates a port number, a fourth layer protocol number, or both of them described in the response packet to another port number, another fourth layer protocol number, or both of them (step S243). Subsequently, the response packet transmission unit 143 transmits a response packet to the external terminal 107 (step S245).

With reference to FIG. 6, the session packet receiver unit 145 continues to wait until it receives a session packet from the external terminal 107 (step S261). If a session packet is received (yes at the step S261), the session packet decision unit 147 determines whether the session packet is a packet according to a predetermined upper protocol (step S263). If the session packet is not a packet according to a predetermined upper protocol (no at the step S263), the session packet discard unit 149 discards the session packet (step S265).

If the session packet is a packet according to a predetermined upper protocol (yes at the step S263), the port number/protocol number reverse translation unit 150 conducts reverse translation on a port number, a fourth layer protocol number, or both of them in the session packet to obtain a port number, a fourth layer protocol number, or both of them before the translation (step S267). Subsequently, the session packet transmitter unit 151 transmits the session packet to the internal terminal 108 (step S269).

In the above-described embodiment, the internal terminal 108 transmits a polling signal to the unauthorized access prevention apparatus 101. Alternatively, a polling proxy apparatus 109 connected to the internal network 105 as shown in FIG. 7 may transmit a polling signal to the unauthorized access prevention apparatus 101.

Figure 8B:
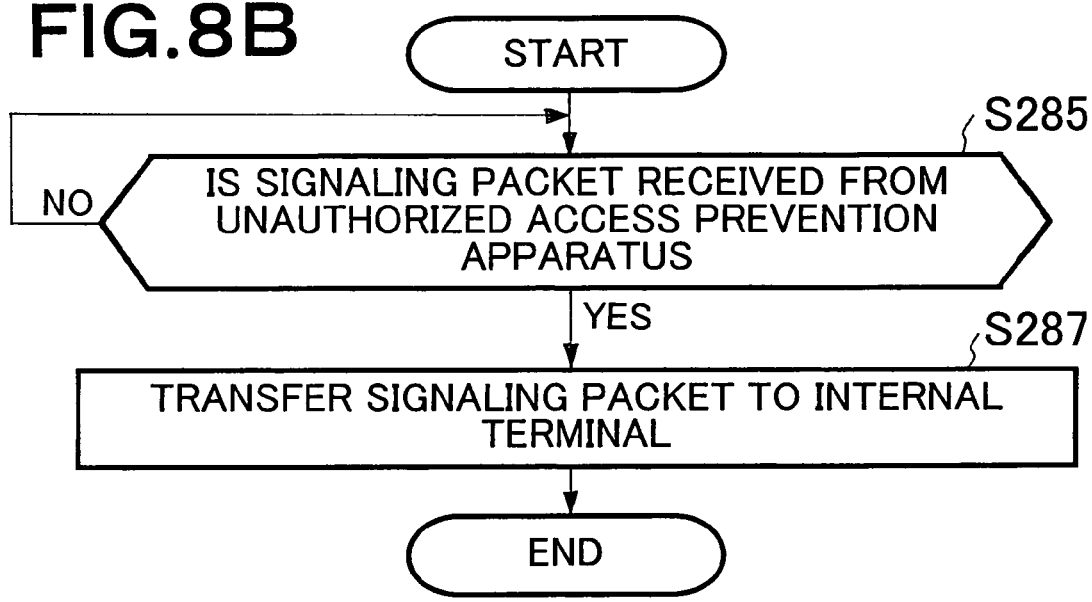
Figure 8C:
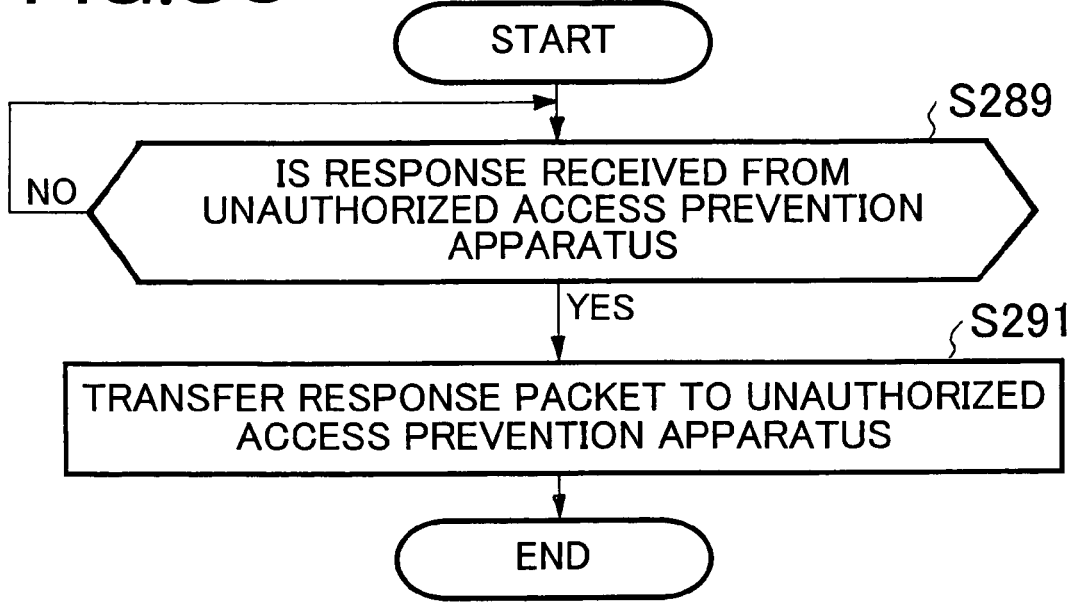

FIGS. 8A to 8C are flow charts showing operation conducted by the polling proxy apparatus 109.

With reference to FIG. 8A, each time fixed time elapses (step S281), the polling proxy apparatus 109 transmits a polling signal to the unauthorized access prevention apparatus 101 (step S283).

With reference to FIG. 8B, the polling proxy apparatus 109 continues to wait until it receives a signaling packet from the unauthorized access prevention apparatus 101 in response to the polling signal (step S285). If a signaling packet is received (yes at the step S285), the polling proxy apparatus 109 transfers the signaling packet to the internal terminal 108 (step S287).

With reference to FIG. 8C, the polling proxy apparatus 109 continues to wait until it receives a response packet from the internal terminal 108 in response to the signaling packet (step S289). If a response packet is received (yes at the step S289), the polling proxy apparatus 109 transfers the response packet to the unauthorized access prevention apparatus 101 (step S291).

In the above-described embodiment, the unauthorized access prevention apparatus 101 is disposed in the demilitarized zone. Alternatively, the unauthorized access prevention apparatus 101 may be disposed within the internal terminal 108 as shown in FIGS. 9A and 9B. The polling proxy apparatus 109 may be disposed within the internal terminal 108 as shown in FIG. 9B.

The present invention can be used to prevent unauthorized access from a network to a terminal.

What is claimed is:

1. An unauthorized access prevention method, comprising:
    receiving a signaling packet for starting a session from a device connected to the network;
    detecting whether the signaling packet received from the device connected to a network contains a description for unauthorized access;
    discarding a signaling packet which apparently contains a description for unauthorized access;
    deleting descriptions of other items from the signaling packet which does not apparently contain the description for unauthorized access, while leaving descriptions of predetermined items including at least a description of a desired port number indicating a port number desired to be used in the session at the signaling packet which does not apparently contain the description for unauthorized access; and
    transmitting the signaling packet obtained after the deletion is conducted to a signaling packet processing unit.

2. The unauthorized access prevention method according to claim 1, wherein transmission of the signaling packet obtained after the deletion is conducted to the signaling packet processing unit is conducted in response to polling.

3. The unauthorized access prevention method according to claim 1, further comprising:
    receiving a response packet, responding to the signaling packet, from the signaling packet processing unit, the response packet containing an available port number indicating a port number which can be used by a session unit to conduct the session;
    translating the available port number to a different port number; and
    transmitting the response packet with the available port number translated to the different port number to the device connected to the network.

4. The unauthorized access prevention method according to claim 3, further comprising:
    receiving a session packet using a port having the different port number contained in the response packet transmitted to the device connected to the network, from the device connected to the network;
    detecting whether or not the session packet is a packet according to a predetermined protocol;
    discarding the session packet if the session packet is not a packet according to a predetermined protocol; and
    conducting reverse translation on a port number in the session packet judged to be a packet according to a predetermined protocol, thereby obtaining a port number before translation, and transmitting a resultant session packet to the session unit.

5. The unauthorized access prevention method according to claim 3, wherein instead of or in addition to translating the available port number to a different port number, an available fourth layer protocol number indicating a fourth layer protocol number which can be used in the session is translated to a different fourth layer protocol number.

6. An unauthorized access prevention apparatus, comprising:
    means for receiving a signaling packet for starting a session from a device connected to a network;
    means for detecting whether or not the signaling packet received from the device connected to the network contains a description for unauthorized access;
    means for discarding a signaling packet which apparently contains a description for unauthorized access;
    means for deleting descriptions of other items from the signaling packet which does not apparently contain the description for unauthorized access, while leaving descriptions of predetermined items including at least a description of a desired port number indicating a port number desired to be used in the session at the signaling packet which does not apparently contain the description for unauthorized access; and
    means for transmitting the signaling packet obtained after the deletion is conducted to a signaling packet processing unit.

7. The unauthorized access prevention apparatus according to claim 6, wherein transmission of the signaling packet obtained after the deletion is conducted to the signaling packet processing unit is conducted in response to polling.

8. The unauthorized access prevention apparatus according to claim 6, further comprising:
    means for receiving a response packet, responding to the signaling packet, from the signaling packet processing unit, the response packet containing an available port number indicating a port number which can be used by a session unit to conduct the session;
    means for translating the available port number to a different port number; and
    means for transmitting the response packet with the available port number translated to the different port number to the device connected to the network.

9. The unauthorized access prevention apparatus according to claim 8, further comprising:
    means for receiving a session packet using a port having the different port number contained in the response packet transmitted to the device connected to the network, from the device connected to the network;

means for detecting whether or not the session packet is a packet according to a predetermined protocol;

means for discarding the session packet if the session packet is not a packet according to a predetermined protocol; and means for conducting reverse translation on a port number in the session packet judged to be a packet according to a predetermined protocol, thereby obtain a port number before translation, and transmit a resultant session packet to the session unit.

10. The unauthorized access prevention apparatus according to claim 8, wherein instead of or in addition to translating the available port number to a different port number, an available fourth layer protocol number indicating a fourth layer protocol number which can be used in the session is translated to a different fourth layer protocol number.

11. A non-transitory computer readable medium storing computer instructions for causing a computer executing the instructions to perform an unauthorized access prevention method, comprising:

receiving a signaling packet for starting a session from a device connected to a network;

detecting whether the signaling packet received from the device connected to the network contains a description for unauthorized access;

discarding a signaling packet which apparently contains a description for unauthorized access;

deleting descriptions of other items from the signaling packet which does not apparently contain the description for unauthorized access, while leaving descriptions of predetermined items including at least a description of a desired port number indicating a port number desired to be used in the session at the signaling packet which does not apparently contain the description for unauthorized access; and transmitting the signaling packet obtained after the deletion is conducted to a signaling packet processing unit.

12. The computer readable medium according to claim 11, wherein transmission of the signaling packet obtained after the deletion is conducted to the signaling packet processing unit is conducted in response to polling.

13. The computer readable medium according to claim 11, wherein said method further comprises:

receiving a response packet, responding to the signaling packet, from the signaling packet processing unit, the response packet containing an available port number indicating a port number which can be used by a session unit to conduct the session;

translating the available port number to a different port number; and transmitting the response packet with the available port number translated to the different port number to the device connected to the network.

14. The computer readable medium according to claim 13, wherein said method further comprises:

receiving a session packet using a port having the different port number contained in the response packet transmitted to the device connected to the network, from the device connected to the network;

detecting whether or not the session packet is a packet according to a predetermined protocol;

discarding the session packet if the session packet is not a packet according to a predetermined protocol; and conducting reverse translation on a port number in the session packet judged to be a packet according to a predetermined protocol, thereby obtaining a port number before translation, and transmitting a resultant session packet to the session unit.

15. The computer readable medium according to claim 13, wherein instead of or in addition to translating the available port number to a different port number, an available fourth layer protocol number indicating a fourth layer protocol number which can be used in the session is translated to a different fourth layer protocol number.

16. The unauthorized access prevention method according to claim 1, wherein said detecting whether the signaling packet received from the device connected to the network contains a description for unauthorized access comprises detecting whether the signaling packet contains a computer virus pattern.

17. The unauthorized access prevention apparatus according to claim 6, wherein said detecting whether the signaling packet received from the device connected to the network contains a description for unauthorized access comprises detecting whether the signaling packet contains a computer virus pattern.

18. The computer readable medium according to claim 11, wherein said detecting whether the signaling packet received from the device connected to the network contains a description for unauthorized access comprises detecting whether the signaling packet contains a computer virus pattern.

* * * * *